Patented July 28, 1925.

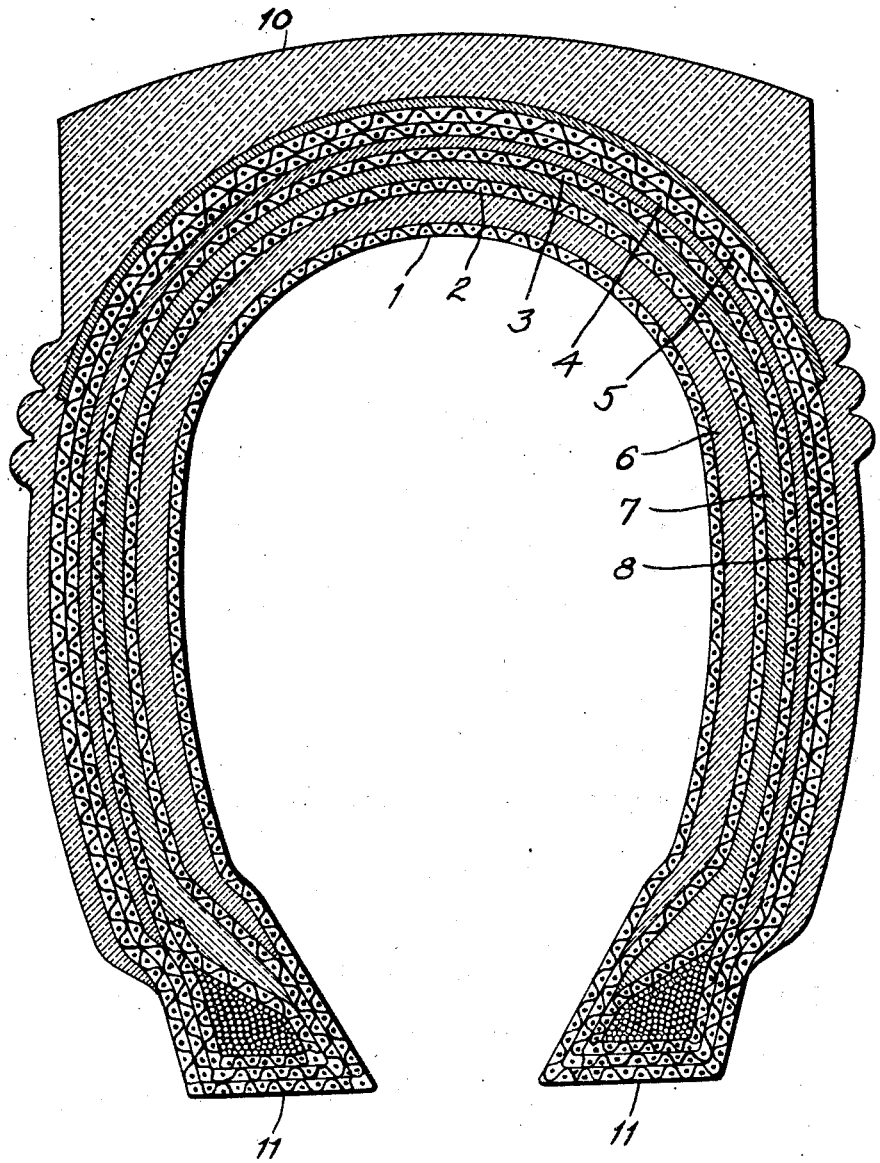

1,547,293

UNITED STATES PATENT OFFICE.

JAMES H. C. BOIG, OF DALLAS, TEXAS, AND WILLIAM SEWARD, OF SEAFORD, NEW YORK.

PNEUMATIC TIRE.

Application filed October 6, 1923. Serial No. 667,080.

*To all whom it may concern:*

Be it known that we, JAMES H. C. BOIG and WILLIAM SEWARD, citizens of the United States, residing, respectively, at Dallas, in the county of Dallas and State of Texas, and Seaford, in the county of Nassau and State of New York, have invented certain new and useful Improvements in Pneumatic Tires; and we do hereby declare the following to be a full, clear, and exact description of the invention, such as will enable others skilled in the art to which it appertains to make and use the same.

Our invention relates to pneumatic tires. Among the objects of our invention are:—

To provide a pneumatic tire having its parts so shaped, located and relatively proportioned that the effects of road shocks and stone bruises thereon will be minimized.

To prove a pneumatic tire in which the effects of excessive deformation occasioned by underinflation or excessive load will be minimized To provide a pneumatic tire of great resiliency.

To provide a pneumatic tire comprising a plurality of plies of fabric alternating with layers of rubber of varying thicknesses to equalize stresses upon said plies.

Heretofore in constructing tires a plurality of plies of woven or cord fabric were each coated with a suitable rubber compound or compounds. Said plies were then cut to proper shape and size, the first ply was laid over a suitable iron core, the other plies were superimposed seriatim thereon, the remaining parts of the tire were added and the whole was then placed in a mold and subjected to heat and pressure. As a consequence of this construction, the layers of rubber between adjacent plies were comparatively thin and the plies freqeuently came into contact. This was especially the case if the tire suffered an injury.

Furthermore, the layers of rubber between adjacent plies were of practically the same thickness and the capacity for yielding of the layers between plies was but slight; hence undue stresses were imposed upon the inner plies.

For the purpose of illustration, we have shown in the drawing our invention as applied to a truck tire, but this is to be understood as merely illustrative of any form of tire embodying our invention.

In the drawing:

1, 2, 3, 4 and 5 are plies of woven or cord fabric or any suitable approximately inextensible flexible material of any desired size and shape, which may be treated in any approved manner.

We first place the ply 1 on any usual or aproved core. We then place the layer 6 upon the ply 1; the ply 2 upon the layer 6; the layer 7 upon the ply 2; the ply 3 upon the layer 7; the layer 8 upon the ply 3; the ply 4 upon the layer 8 and the ply 5 upon the ply 4; thus forming the carcass of the tire.

Any usual or approved forms of breaker, cushion and tread may then be placed upon the carcass and the edges thereof may be equipped with wires as shown or with beads. The tire is then to be placed in a mold and subjected to heat and pressure in the usual manner.

It is to be noted that the layers 6, 7 and 8, which are formed of any suitable elastic material as a compound, including rubber, are comparatively thick and are progressively thinner from the inner to the outer layer and extend around the tire and approximately between the wires or beads.

The layers are made comparatively thick in order to cushion and insulate the plies to prevent moisture from permeating and rotting same. By this construction, we insure that the plies will remain dry and in case of injury the layers, even though punctured, will close the edges of the fissure therein and prevent the ingress of any considerable amount of moisture.

The layers, which form cushions between consecutive plies, are made progressively thinner from the inner layer to the outer layer in order to provide a capacity for yielding between said layers that is progressively larger from the tread inwardly.

It is evident that the stresses applied to the tread 10 will move the same towards the edges 11—11 and will consequently increase the radii of curvature of the plies adjacent the tread, increasing the radius of curvature of the ply 1 comparatively more than that of the other plies.

As a consequence, a stretching action is produced upon the plies which would increase from the outside inwardly and be greatest upon the inner ply were it not that we place a layer upon the inner ply of such a thickness that it will yield or flow sufficiently to avoid undue stress upon said ply. We place layers of such thicknesses upon the other plies as to render the stresses thereupon approximately equal to the stress upon the inner ply.

One set of proportional values which we have found suitable for the thicknesses of the layers and plies is as follows:—

Layer 6—2½ parts,
Layer 7—1½ parts,
Layer 8—1 part.
Each of the plies 1 part.

These values may be varied as desired or as indicated by experiment and the number of layers and plies may be also varied.

By making the layers of varying thicknesses as set forth, we not only equalize stresses due to faults in manufacture, but also insure that the stresses upon the plies will be equalized. For both reasons, excessive stresses upon any part of the tire are eliminated and its life greatly increased.

Furthermore, the layers act as cushions to lessen the force of shocks upon the plies and increase the resilience of the tire.

While we have shown four plies and three layers between the piles, it is evident that the number of both may be varied and that the relative thicknesses of the layers may also be varied without departing from the spirit of our invention.

We claim:—

1. In a tire, the combination with a plurality of plies of approximately inextensible flexible material, of layers of elastic material between consecutive plies, said layers progressively decreasing in thickness from the inside to the outside of said tire.

2. In a tire, the combination with a plurality of plies of approximately inextensible flexible material, of layers of elastic material between consecutive plies, said layers progressively decreasing in thickness from the inside to the outside of said tire, none of said layers being less in thickness than the thickness of one of said plies.

3. In a tire, the combination of a plurality of plies of fabric, of layers of rubber between consecutive plies, the thickness of said layers progressively decreasing from the inside to the outside of said tire.

4. In a tire, the combination with a plurality of plies of fabric, of layers of rubber between consecutive plies, the thickness of said layers progressively decreasing from the inside to the outside of said tire, none of said layers being less in thickness than the thickness of one of said plies.

5. In a pneumatic tire, the combination with a plurality of plies of fabric, of cushions between consecutive plies to minimize the shocks upon said plies, said cushions being progressively thinner from the inside to the outside of said tire.

In testimony whereof, we affix our signatures.

JAMES H. C. BOIG.
WILLIAM SEWARD.